Sept. 29, 1936.  A. B. RAY  2,055,774
ODOR FILTER
Filed June 30, 1933   3 Sheets-Sheet 1
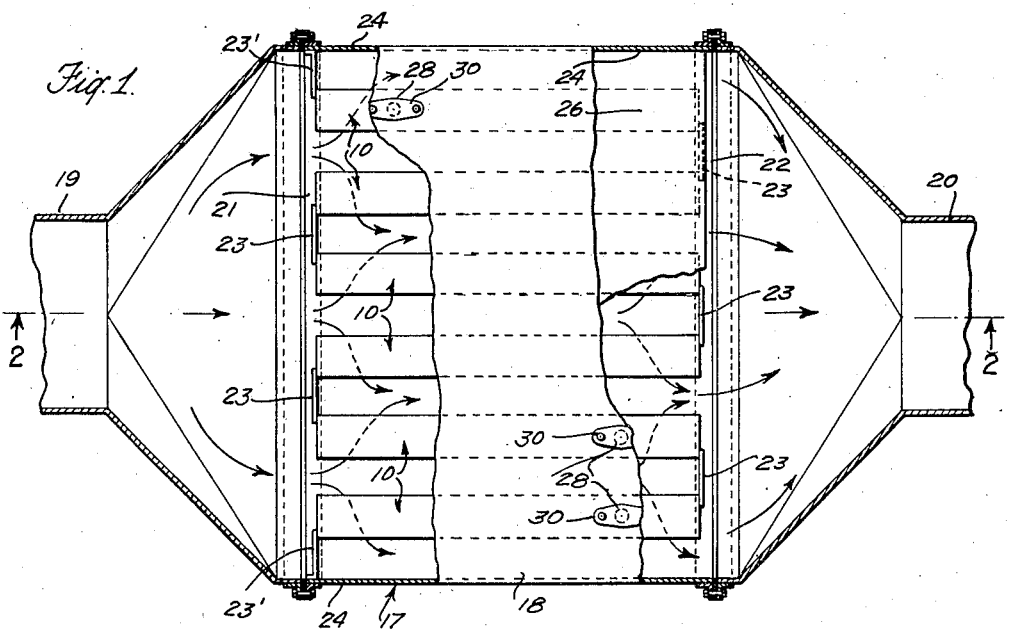
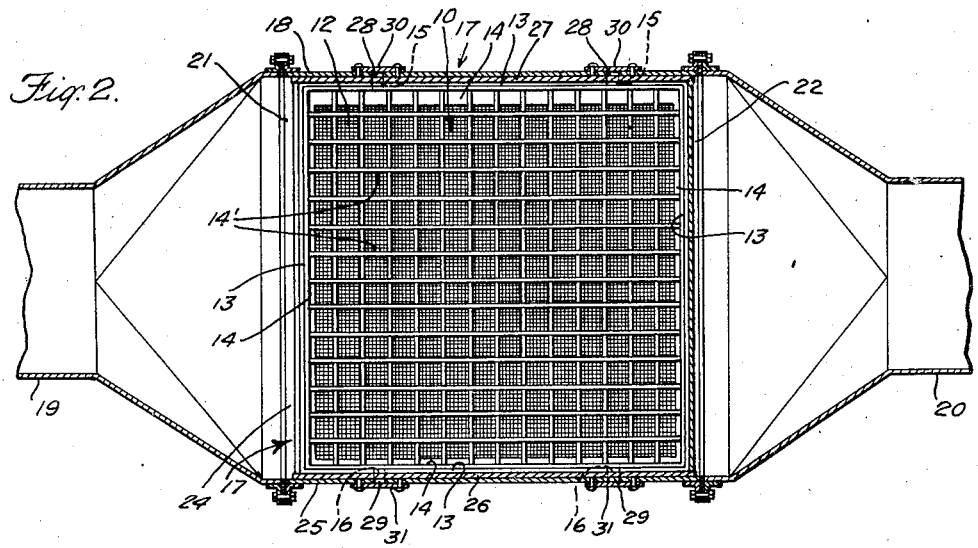
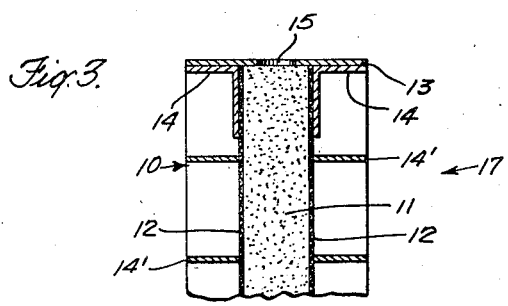
INVENTOR
ARTHUR B. RAY
BY
E. L. Greenewald
ATTORNEY

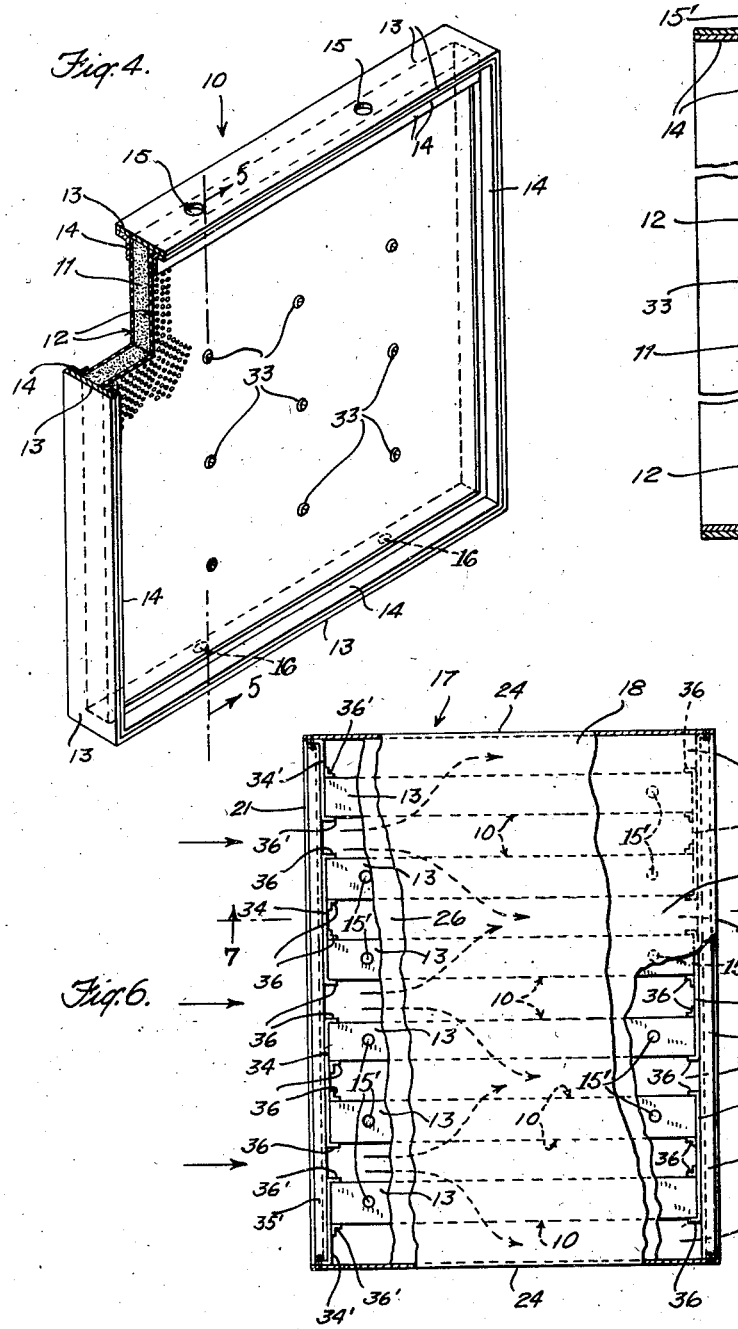

Sept. 29, 1936. A. B. RAY 2,055,774
ODOR FILTER
Filed June 30, 1933  3 Sheets-Sheet 3

INVENTOR
ARTHUR B. RAY
BY
ATTORNEY

Patented Sept. 29, 1936

2,055,774

UNITED STATES PATENT OFFICE 2,055,774

ODOR FILTER

Arthur B. Ray, Bayside, N. Y., assignor, by mesne assignments, to Union Carbide and Carbon Corporation, a corporation of New York Application June 30, 1933, Serial No. 678,390

2 Claims. (Cl. 183—49)

This invention relates to odor filters for removing objectionable odors and impurities present in air, and has for its object the provision of an improved odor filter for economically and efficiently removing such odors and impurities from air.

Although air washers and filters are employed in ventilating and air conditioning systems for removing from air solid particles, such as dust and soot, they do not satisfactorily remove oderiferous substances and impurities in the form of gases and vapors. It has been found that the accumulation of odoriferous substances and impurities in air in ventilating and air conditioning systems can be prevented by causing the odor laden air to come in contact with a highly adsorptive material, such as activated carbon. The active adsorbent carbon forms an adsorption complex with the odorferous material and holds it tenaciously. In some cases the activated carbon may act as a catalyst and cause oxidation or decomposition of impurities adsorbed from air. One such case is the oxidation of hydrogen sulphide to sulphur and water. The active adsorbent carbon preferably employed is of the type described and claimed in United States Letters Patent Nos. 1,497,543 and 1,497,544, granted June 10, 1924 to Newcomb K. Chaney.

Carbon of the type specified in the above-mentioned Chaney patents is particularly suited for air deodorization because of its ability to adsorb and retain gases and vapors present in air in extremely low concentrations. To remove odors it is necessary that the relatively large volumes of air delivered to or discharged from an enclosure in a ventilating or air conditioning system be brought into intimate contact with the active adsorbent carbon. This is preferably accomplished by arranging granular adsorbent carbon in thin beds through which the air passes.

It is not generally economically feasible to employ activated carbon beds having a resistance to air passage of much over one inch of water, and beds having a lower resistance in many instances are desirable. For example, in ventilating and air conditioning individual rooms and enclosures with unit types of air conditioning apparatus, it is desirable to limit the resistance of carbon beds to the passage of air approximately to a pressure drop equivalent to one-half inch of water.

These low resistances to the passage of air can be attained by using carefully sized granular activated carbon in very thin beds and by passing air through the beds at moderate velocities. For example, a bed one-half inch thick of granular carbon capable of passing through a 6 mesh and of being retained by a 14 mesh screen will satisfactorily remove odors and impurities from air passed through such a bed at a linear velocity of approximately 60 feet per minute. The preferable thickness of the carbon bed is approximately one inch, but in some cases carbon beds several inches thick may be used.

In many cases, even though the concentration of odiferous material is very low, activated carbon is capable of adsorbing an amount of odoriferous material as high as 10% to 20% of its own weight before it ceases to be effective. Since the amount of odoriferous material present in air is usually extremely low, a small amount of carbon will deodorize a large volume of air and therefore remain effective for a relatively long period of time. When the activated carbon becomes saturated with the odoriferous material and ceases to be an effective deodorant, it is removed and replaced with fresh activated carbon, or the saturated carbon may be removed and reactivated by suitable treatment to remove the adsorbed material. Even when the activated carbon is saturated with odoriferous material it will not restrict the flow of air. To remove odors and impurities from the large volumes of air generally encountered in ventilating and air conditioning systems, it is necessary to provide a large bed area of activated carbon having a low resistance to the passage of air; and it is desirable to arrange such a large area of activated carbon compactly in the minimum amount of space, and in such a manner as to permit easy removal and replacement. In accordance with the principles of this invention I provide a plurality of cells of activated carbon which serve as individual units of a carbon bed, and arrange these cells in a casing in such a manner as to form a zig-zag structure which will occupy a minimum amount of space, so that all of the air flowing through the casing will pass through the carbon cells.

Reference will now be made to the accompanying drawings wherein I have illustrated several types of odor filters embodying the principles of my invention, in which:

Fig. 1 is a plan view of an odor filter embodying my invention connected in an air duct, with the cover thereof partly broken away;

Fig. 2 is a vertical sectional view taken on line 2—2 of Fig. 1, showing a side view of one of the carbon cells disposed in the casing of the odor filter;

Fig. 3 is an enlarged fragmentary transverse sectional view of a single carbon cell shown in Figs. 1 and 2, to illustrate the construction of the carbon cells more clearly;

Fig. 4 is a perspective view, partly broken away, of a modified construction of the carbon cells shown in Figs. 2 and 3;

Fig. 5 is a transverse sectional view of the carbon cell shown in Fig. 4;

Fig. 6 is a plan view of a modified construction of the odor filter illustrated in Figs. 1 to 3 inclusive, with the cover partly broken away, in which each carbon cell can be removed independently of the other cells from the casing of the odor filter;

Figure 7:
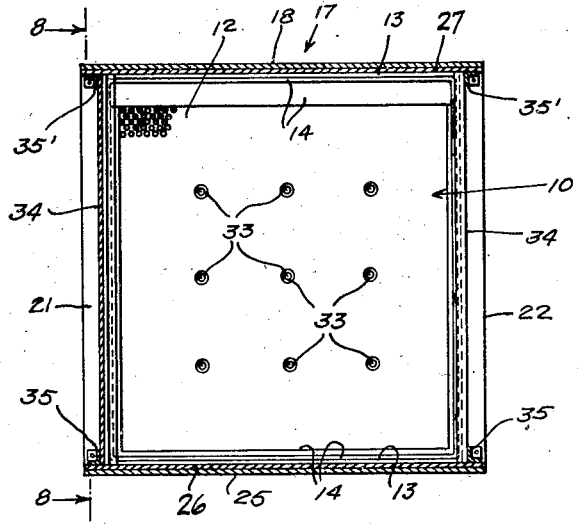
Fig. 7 is a vertical sectional view taken on line 7—7 of Fig. 6.

Referring to Figs. 1 to 3 inclusive of the drawings, the odor filter embodying my invention comprises a plurality of cells 10, containing granular activated carbon 11, arranged alongside and in spaced relation to each other. As shown in Figs. 2 and 3, the cells 10 comprise spaced and cooperating perforated members or screens 12 disposed within and spaced from the extreme edges of narrow multi-sided frames 13, preferably rectangular in shape. Although I prefer to use wire screen material not affected by impurities in the air for forming the enclosing walls of the cells 10, any suitable gas permeable material in sheet-like form may be used. The screens 12 are maintained in position a short distance in from the edges of the frames 13 by angle members 14 which extend along the inside walls of the frames and have one leg secured to the sides of the frames and the other inwardly extending leg secured to peripheral edges of the screens 12. By maintaining the screens 12 in position a short distance in from the edges of the frames 13, recesses are formed on each side of the cells 10; and in these recesses grilles or gratings 14' may be positioned, the edges of which are secured to the angle members 14. With this construction the cooperating screens 12 of each cell 10 are prevented from bulging outward and the spaced relation therebetween is maintained substantially uniform throughout their entire areas, so that the thickness of the beds of activated carbon 11 is approximately always constant.

Referring to Fig. 2, it will be noticed that the portion of the angle member 14 secured to the top peripheral edge of the screen 12 is considerably wider than similar portions of the other angle members 14. By making this portion of the top angle members 14 relatively wide, it will extend downward a sufficient distance to prevent any by-passing of air over the carbon 11 when the granules tend to settle in the cells 10. Instead of forming imperforate upper portions in the enclosing walls of the cells 10, the entire areas of the enclosing walls may comprise a gas-permeable material and the by-passing of air prevented by a single downward extending baffle plate secured to the upper side of the frame 13 between the edges thereof.

For filling and emptying the cells 10 with activated carbon by gravity, one or more openings 15 are provided in the upper sides of the frames 13, as shown in Figs. 1 and 3, and similar openings 16 may be provided in the lower sides thereof.

The cells 10 are arranged in uniform spaced relation in a casing 17, having a removable cover 18, which may be connected between the ends of two adjacent ducts 19 and 20 of a ventilating or air conditioning system when the carbon area of the cells 10 is large enough to adsorb the odors and impurities from the air passing through the ducts. To maintain a uniform distribution of air flow through the cells 10, the ends 21 and 22 of the casing are open, the open ends 21 and 22 serving as an inlet and outlet for air.

One end of each cell 10 is connected by a plate 23 to one end of a cell 10 adjacent to one side thereof, and the opposite end of each cell 10 not adjacent to the side walls 24 of the casing is connected by similar plate 23 to the end of a cell 10 on the other side thereof. The cells 10 and plates 23 are of substantially the same height as the casing 17, and together they form a zig-zag structure in the casing 17. When the cells 10 and plates 23 are in a normal position in the casing 17, the unconnected or free ends of the outermost cells 10 which are adjacent to the side walls 24 of the casing 17 are connected by plates 23' to the walls 24. In this manner a continuous zig-zag structure comprising the cells 10 and plates 23 and 23' extends between the walls 24 of the casing, so that the air flowing therethrough will pass through the beds of activated carbon 11, as indicated by the arrows in Fig. 1. In coming in intimate contact with the activated carbon, the objectionable odors and impurities are adsorbed by the carbon and removed from the air.

To insure an air-tight fit between the cells 10 and baffle plates 23 and 23' and the bottom 25 and cover 18 of the casing 17, a layer 26 of suitable gasket material, such as a sheet of rubber or felt, is provided at the bottom 25 of the casing upon which the lower sides of the frames 13 rest; and a layer 27 of similar gasket material is provided between upper sides of the frames 13 and the removable cover 18.

It may be desirable in some instances to empty and fill the cells 10 with activated carbon by gravity when the cells 10 are in a normal position in the casing. To accomplish this the removable cover 18 and bottom 25 of the casing and the layers 27 and 26 of gasket material adjacent thereto are provided with openings 28 and 29 in alignment with the openings 15 and 16, respectively, in the frames 13. The openings 28 and 29 are normally closed by removable cover plates 30 and 31 respectively, secured to the cover 18 and bottom 25 of the casing 17.

In Figs. 4 and 5, I have shown a modified embodiment of carbon cells which I employ in my improved odor filter, the parts in these figures which are the same as shown in Fig. 2 and 3 being designated by the same reference numerals. In place of arranging grilles or gratings on each side of the spaced and cooperating perforated plates 12 for maintaining the thickness of the beds of activated carbon 11 substantially constant throughout their entire areas, as shown in Figs. 2 and 3 and described above, a plurality of pins 32 are employed which extend between the perforated plates 12 and are spaced from each other. The ends of the pins 32 are threaded to receive nuts to maintain the spacing of the perforated plates 12 substantially uniform.

When pins are employed for maintaining the thickness of the carbon beds substantially uniform throughout their areas, thin sheets of perforated metal are used instead of screening, as small areas of screen material tend to bulge at points between the location of the pins. Screening can be satisfactorily used in the first embodiment described and illustrated in Figs. 2 and 3, because the gratings or grilles form a more closely spaced support to prevent any appreciable bulging of the screens between points of support. When the cells are internally braced the frames may be narrower than when external bracing of screens is employed, because the perforated sheets may be set at or very close to the edges of the frame.

Figure 8:
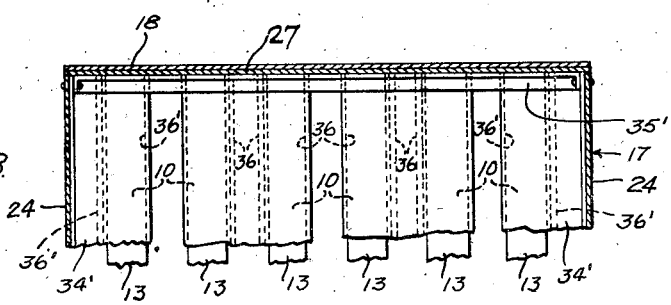
Fig. 8 is a fragmentary transverse sectional view taken on line 8—8 of Fig. 7.

In Figs. 6 to 8 inclusive I have shown an embodiment of my invention in which cells of the types illustrated in Figs. 4 and 5 are employed, and in which each cell is independently removable from the casing of the odor filter. It should be understood, however, that cells of the type illustrated in Figs. 2 and 3 can be used in this embodiment in place of the type of cell illustrated in Figs. 4 and 5. The parts in this embodiment which are the same as shown in Figs. 1 to 5 inclusive are designated by the same reference numerals for the sake of clearness. In this embodiment U-shaped and L-shaped plates 34 and 34', having inwardly extending flanges, are arranged vertically in spaced relation at the open ends 21 and 22 of the casing 17, and these plates are secured at their lower and upper ends to spaced angle members 35 and 35', respectively, which extend transversely across the casing and are secured at their ends to the side walls 24 of the casing. To the plates 34 and 34' are secured angle brackets 36 and 36' having inwardly extending flanges or projections, and adjacent pairs of these flanges and the flanges of the plates 34 and 34' at the opposite ends 21 and 22 of the casing, serve as guideways for receiving and supporting each cell 10 in position in the casing. As shown in Fig. 6, the plates 34 connect one end of each cell 10 and an end of an adjacent cell, and plates 34' connect one end of the cells adjacent to the walls of the casing and those walls. In this embodiment, also, the cells 10 and plates 34 and 34' form a zig-zag structure which extends transversely across the casing between the side walls 24, so that air entering at the inlet opening of the casing will pass through the carbon cells; and, after objectionable odors and impurities are adsorbed from the air by the activated carbon, the purified air will flow through the outlet opening of the casing.

In the odor filter structure shown in Figs. 6 to 8 inclusive, the removable cover 18 and bottom 25 are not provided with normally enclosed openings for emptying and filling the cells 10 with carbon while they are in their normal position in the casing 17. In this filter structure the openings 15 and 16 in the cells 10 may be provided with suitable closure members such as rubber plugs 15' and 16' indicated in Fig. 5, and when it is desired to empty and refill any one cell 10, the cover 18 is removed from the casing 17 and the cell 10 taken out of the casing for recharging the same with fresh activated carbon.

It will thus be seen that, by providing a plurality of units or cells containing granular activated carbon in thin layers and by arranging these cells so as to form a zig-zag structure, a large area of activated carbon is obtained having an extremely low resistance to the passage of air flowing therethrough. Since these odor filters are generally located where the space factor is of considerable importance, the zig-zag arrangement of the carbon cells is particularly advantageous because the cells will occupy a minimum amount of space without any sacrifice in bed area of activated carbon for deodorizing large volumes of air.

Although I have illustrated one embodiment of my invention in which my improved odor filter is connected directly in a duct of a ventilating or air conditioning system, it may be desirable or necessary in certain instances, particularly where large volumes of air are to be deodorized, to arrange a plurality of these odor filters in a room or large container, having an air inlet and outlet, in such a manner that the odor filters will form a wall or partition through which the large volumes of air will pass. When such an arrangement is employed, it will be convenient to place the cells so that they can be individually removed for emptying out the used carbon and refilling with fresh carbon.

I claim:

1. An odor filter for removing objectionable odors and impurities from air, comprising the combination of a casing provided with a removable cover and having an inlet and an outlet for air; a plurality of narrow cells adapted to be disposed in said casing and independently removable therefrom, each of said cells comprising a multi-sided frame having perforated members secured thereto in spaced relation to each other; granular activated carbon adapted to be retained in said cell; at least two spaced horizontal members disposed in the same vertical plane adjacent said inlet and outlet, respectively, such members extending transversely across said casing and having the ends thereof secured to the side walls of said casing; a plurality of spaced vertical plates, having inwardly extending flanges, secured to said horizontal members; and angle brackets secured to said plates and having inwardly extending flanges which are parallel to and spaced from the flanges on said plates, the inwardly extending flanges of said angle brackets and said plates being adapted to receive and maintain each of said cells in a position alongside of each other within said casing; said plates, angle brackets, and cells forming a zig-zag structure extending between the walls of said casing whereby air flowing through said casing will pass through said cells.

2. An odor filter for removing objectionable odors and impurities from air, comprising the combination of a casing having open ends adapted to serve as an inlet and an outlet for air; a plurality of narrow cells adapted to be disposed in said casing and independently removable therefrom, each of said cells comprising a multi-sided frame of substantially the same height as said casing and having perforated members secured thereto in spaced relation to each other, said frames each having at least one opening in a side thereof for filling and emptying said cell with activated carbon; at least two spaced horizontal members disposed in the same vertical plane adjacent said inlet and outlet, respectively, such members extending transversely across said casing and having the ends thereof secured to the side walls of said casing; a plurality of spaced vertical plates, having inwardly extending flanges, secured to said horizontal members; angle brackets secured to said plates and having inwardly extending flanges which are parallel to and spaced from the flanges on said plates, the inwardly extending flanges of said angle brackets and said plates being adapted to receive and maintain each of said cells in a position alongside of said other cells within said casing; said plates, angle brackets, and cells forming a zig-zag structure extending between the walls of said casing whereby air flowing through said casing will pass through said cells; and a cover removably secured to said casing.

ARTHUR B. RAY.